Figure 1:
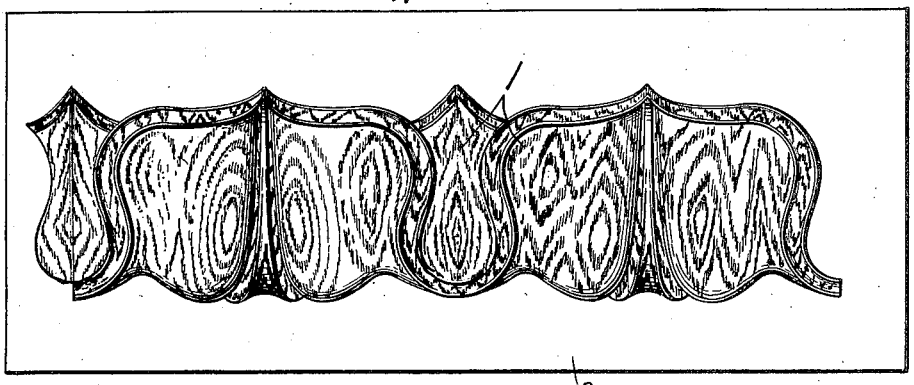

A. M. HOLSTEIN.
METHOD OF MAKING PLASTIC ORNAMENTS.
APPLICATION FILED MAY 21, 1906.

903,189.

Patented Nov. 10, 1908.

2 SHEETS—SHEET 1.

WITNESSES.

INVENTOR.
BY,
ATTORNEY.

A. M. HOLSTEIN.
METHOD OF MAKING PLASTIC ORNAMENTS.
APPLICATION FILED MAY 21, 1906.
903,189.
Patented Nov. 10, 1908.
2 SHEETS—SHEET 2.
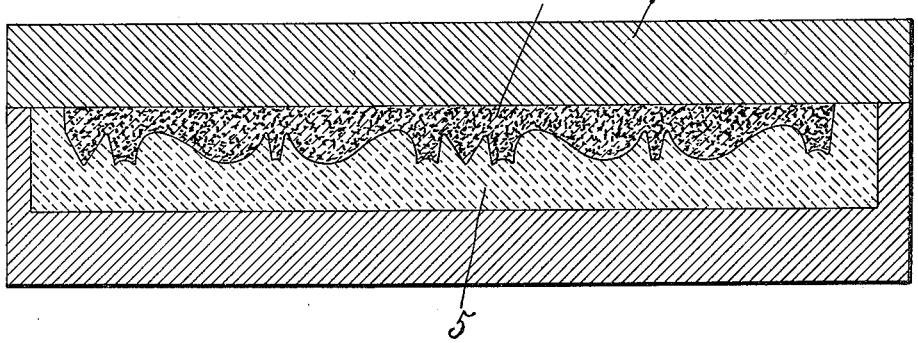
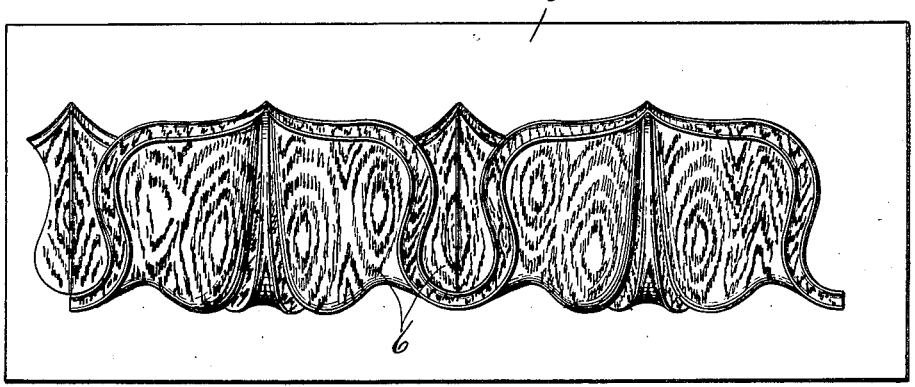
WITNESSES.
INVENTOR.
A. M. Holstein
BY.
Howard P. Denison
ATTORNEY.

UNITED STATES PATENT OFFICE.

ADOLPH M. HOLSTEIN, OF SYRACUSE, NEW YORK.

METHOD OF MAKING PLASTIC ORNAMENTS.

No. 903,189.   Specification of Letters Patent.   Patented Nov. 10, 1908.

Application filed May 21, 1906. Serial No. 317,968.

*To all whom it may concern:*

Be it known that I, ADOLPH M. HOLSTEIN, of Syracuse, in the county of Onondaga, in the State of New York, have invented new and useful Improvements in Methods of Making Plastic Ornaments, of which the following, taken in connection with the accompanying drawings, is a full, clear, and exact description.

This invention relates to the manufacture of plastic ornaments, whereby I am enabled to reproduce in plastic material the configuration, and particularly the grain, of any wood ornament or carving.

I am aware that it is common to impress ornamental contours in plastic material to be used as molding for decorative purposes, and also for producing casket ornaments, but in all of these plastic commercial products, so far as I am aware, the ornamental surface has been practically smooth and free from any impression of the grains of different woods.

The essential purpose, therefore, of my present invention is to reproduce in plastic material the grain of the wood which the plastic ornament is designed to represent. It is well known that these different woods are characterized or distinguished by their particular grain, and in the production of a plastic ornament having a grain to represent any particular wood, a carving is first made in such wood of the ornament which it is desired to reproduce in plastic material. The surface of the carving is then treated with a liquid, such as pure lard oil, which causes the grain to stand out more clearly and at the same time, prevents adhesion of the plastic material to the ornamented surface of the carving when making the mold. This prepared ornament is then impressed into a body of plastic material which is sustained in a suitable frame or flask for the purpose of making a negative impression in such plastic material, after which the positive wood carving is withdrawn, leaving a negative mold, from which a metal mold may be cast, it being understood that the grain of the wood carving is clearly impressed in the plastic mold, and may be reproduced in the metal mold. The plastic material from which the ornament is to be formed is then placed in the metal mold and subjected to sufficient pressure to cause the entire contour, together with the grain, to be imparted to the plastic body, which is then removed and properly trimmed to remove superfluous material, and the whole ornamented surface is then stained to exactly imitate the color of the wood of the positive wood carving, or any variations in color to suit the taste of the user, the plastic ornament being then ready for use. In some instances, however, I may prefer to incorporate the stain in the plastic mixture before it is molded into an ornament, thereby giving a natural color to the whole body so that if a portion of the ornament should be broken off, the imperfection would not be so noticeable as when the stain is applied merely to the surface of the ornament.

The various steps in the manufacture of these plastic ornaments are shown in the drawings, in which—

Figure 2:
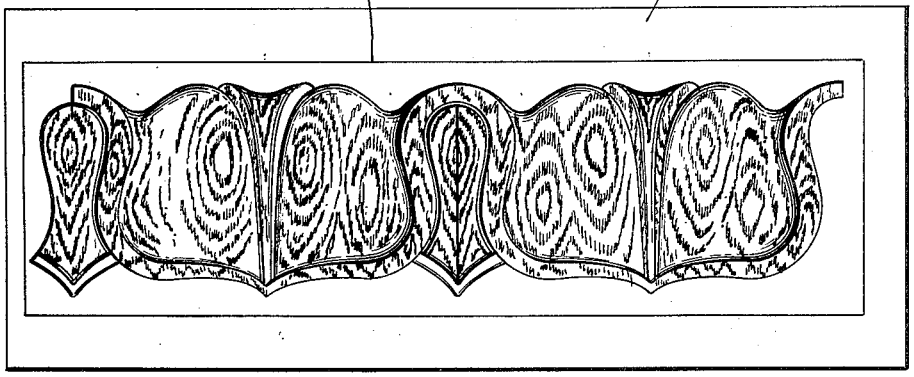
Figure 3:
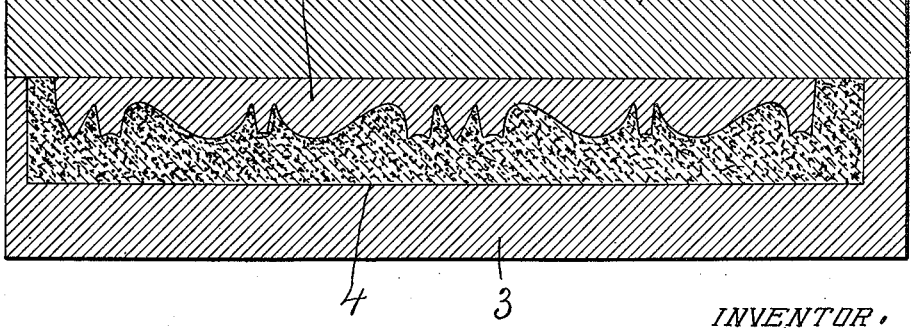

Figure 1 is a face view of a positive wood carving. Fig. 2 is a plan of the negative plastic mold. Fig. 3 is a sectional view of the plastic wood carving as impressed into a body of plastic material to form the mold seen in Fig. 2. Fig. 4 is a similar sectional view of a metal negative mold made from the plastic mold seen in Fig. 2, and a body of plastic material impressed against said mold to form a positive plastic ornament. Fig. 5 is a face view of the positive plastic ornament seen in Fig. 4.

I have sought by this process to produce any plastic ornament in which the grain, pores and other characteristics of any particular wood may be exactly reproduced as an economic substitute for wood to be used in any and all places where wood moldings or wood carvings might be desired for decorative purposes.

Up to the present time plastic ornaments of different designs have been made by rotary and reciprocatory dies, such ornaments being usually glued or otherwise fastened to different wood moldings, such as picture frames, and wall moldings, but the ornamented contours have always been smooth with no attempt to imitate the characteristic grains and pores of any particular wood. My improvements, therefore, consist, mainly in the production of plastic ornaments in which the grain, pores and other peculiar characteristics of individual woods are reproduced.

In carrying out the objects stated; I first make a wood carving, as —1—, of the desired ornamentation or configuration, always using the wood, the grain of which it is desired to reproduce in the plastic ornament. For instance, if it is desired to produce a plastic ornament to imitate oak, the configuration is first carved in oak, or if it is desired to produce a plastic ornament in imitation of mahogany, the ornament is first carved in mahogany, and so on through the list of the different woods. After the wood ornament is carved, it is mounted upon and usually secured to a suitable backing, as —2—, thereby forming a positive die, as seen in Fig. 1. The surface of the carving is then treated with a suitable liquid, such as oil, which gives the grain a more conspicuous relief, and at the same time, prevents adhesion of the wood to the plastic body during the formation of the negative. The next step in the process is to provide a wood block, as —3—, with a rough chamber, as —4—, of slightly greater dimensions than the outer dimensions of the ornament, and to place into such chamber a quantity of composite plastic material of a putty-nature, containing a fibrous bond and an adhesive, as glue or cement, to form a cohesive plastic mass, into which the wood carving is firmly pressed with a sufficient degree of force so that when the positive carving is removed, a negative impression of such carving, including an exact reproduction of the grain, is made in the plastic body, the plastic negative being best shown in Fig. 2, while the manner of making such impression is shown in Fig. 3. The ingredients of this plastic material, more specifically stated, consist of a quantity of plaster-of-paris, raw linseed or crude oil, a suitable bond, as wood fiber or some ciliary substance, glue and glycerin all thoroughly mixed and kneaded so as to diffuse the various ingredients and thoroughly incorporate them into a plastic moldable mass; the glue being in such proportion as to be evenly distributed throughout the mass and to appear in the surface thereof when moistened by steam or otherwise. The glycerin is used to render the composite material pliable, especially when slightly warmed, and the fiber serving to bind them together.

The negative plastic mold is now allowed to set or harden, and may then be treated to a light coat of oil, and used for the reproduction of positive plastic ornaments. While this plastic negative mold may be useful in the reproduction of a limited number of positive plastic ornaments it is not adapted for continuous use, and I therefore, prefer to use it as a pattern from which a negative metal mold, as —5— may be cast, or otherwise formed, as shown in Fig. 4. I have discovered, however, that a thin metal negative may be made by electro-plating directly upon the surface of the plastic negative, and in order to render this thin plate useful in the reproduction of positive plastic ornaments, it is usually backed up by some easily fusible metal, such as Babbitt metal which may be poured, when melted, upon the back of the negative electro plate to the desired thickness for the purpose of reinforcing the thin metal surface, thereby forming a metal negative mold in which the positive plastic ornament, as —6—, Figs. 4 and 5, may be pressed with sufficient force to reproduce all the ornamental contours, grains and pores from the metal negative into the plastic body. In forming this positive plastic ornament in the negative mold, a body of composite plastic material, previously described, is spread over the negative surface sufficient to entirely cover the same, which is then firmly pressed by a suitable plate, as —7—, against the negative surface, thereby forming a positive plastic ornament —6—, which is an exact reproduction of the wood carving shown in Fig. 1. After the positive plastic ornament is thus formed, it is withdrawn from the negative die —5— and its rear face, which is usually plain, is then steamed sufficiently to moisten the adhesive, whereupon it is adhesively applied to the casket or to any other body, as —8—, for which such an ornament is desired.

I desire to incorporate in my present application that part of my process by which the stain is incorporated and thoroughly mixed into the plastic material before forming it into a mold.

What I claim is:

The process of reproducing the grain, pores and other characteristics of wood ornaments, consisting first in making an ornament of the wood which it is desired to imitate then treating the ornamented surface of the wood with a liquid lubricant to render the grain and pores more distinct and in greater relief and to prevent adhesion of the wood to the plastic negative, then preparing a plastic composite body of plaster of paris, oil and glue together with a bond of ciliary substance thoroughly mixed and kneaded together and placing such plastic body in a suitable receptacle, then pressing the wood ornament into such plastic body with sufficient force to form a negative of the wood ornament including the grain and pores thereof, then withdrawing the wood ornament and allowing the negative surface to harden, then preparing a second body of the same plastic material and impressing it against the negative surface with sufficient force to cause the reproduction of such negative surface including the grain and pores to form a positive ornament and finally removing the positive ornament from the negative.

In witness whereof I have hereunto set my hand this 14 day of May, 1906.

ADOLPH M. HOLSTEIN.

Witnesses:
H. MAZUR,
LEON MAZUR.